(12) United States Patent
Tsuzuki et al.

(10) Patent No.: US 10,495,203 B2
(45) Date of Patent: Dec. 3, 2019

(54) TORQUE CONVERTER AND MANUFACTURING METHOD THEREOF

(71) Applicant: AISIN SEIKI KABUSHIKI KAISHA, Kariya-shi, Aichi-ken (JP)

(72) Inventors: Yukihisa Tsuzuki, Kariya (JP); Ayumi Mori, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 109 days.

(21) Appl. No.: 15/297,398

(22) Filed: Oct. 19, 2016

(65) Prior Publication Data

US 2017/0108101 A1 Apr. 20, 2017

(30) Foreign Application Priority Data

Oct. 19, 2015 (JP) .................................. 2015-205635

(51) Int. Cl.
*F16H 41/28* (2006.01)

(52) U.S. Cl.
CPC .................... *F16H 41/28* (2013.01)

(58) Field of Classification Search
CPC .................... F16D 33/20; F16H 41/26
See application file for complete search history.

(56) References Cited

U.S. PATENT DOCUMENTS

| | | | | |
|---|---|---|---|---|
| 2,287,496 A * | 6/1942 | Popper | .................... | F16D 33/20 192/58.3 |
| 2,306,639 A * | 12/1942 | Miller | .................... | F01D 5/141 416/180 |
| 2,381,187 A * | 8/1945 | Swift | .................... | F16D 33/20 60/367 |
| 2,663,148 A * | 12/1953 | Jandasek | .................... | F16H 41/26 60/362 |
| 3,940,929 A * | 3/1976 | Bezimensky | .................... | F16D 33/20 60/330 |
| 4,260,330 A * | 4/1981 | Frotschner | .................... | F16H 41/26 416/180 |
| 2006/0064970 A1 * | 3/2006 | Tsuzuki | .................... | F16H 41/26 60/361 |

FOREIGN PATENT DOCUMENTS

| | | | | | |
|---|---|---|---|---|---|
| DE | 1123533 B | * | 2/1962 | ............ | F16H 41/26 |
| FR | 752637 A | * | 9/1933 | ............ | F16H 41/26 |
| GB | 707482 A | * | 4/1954 | ............ | F16H 41/26 |
| GB | 1485029 A | * | 9/1977 | ............ | F16D 33/02 |
| JP | 1-307565 A | | 12/1989 | | |
| JP | 11-2304 A | | 1/1999 | | |
| JP | 2013-155857 A | | 8/2013 | | |

* cited by examiner

*Primary Examiner* — F Daniel Lopez
*Assistant Examiner* — Matthew Wiblin
(74) *Attorney, Agent, or Firm* — Buchanan Ingersoll & Rooney PC (57) ABSTRACT

A torque converter which is a hydraulic torque converter that transmits power via a fluid, includes: a shell which is connected to a power transmission source, and is rotated by the power of the power transmission source; an impeller blade which is fixed to an inner surface of the shell, and generates a flow in the fluid by rotating together with the shell; and a turbine runner which is connected to a power transmission destination, and is rotated by the flow of the fluid, in which the impeller blade has an inlet angle which is equal to or less than 0 degrees, and in which at least a part of an inlet portion to which the fluid enters is bent toward a rotational direction side of the impeller blade.

3 Claims, 10 Drawing Sheets

FIG.8
PERFORMANCE OF TORQUE CONVERTER

TORQUE CONVERTER AND MANUFACTURING METHOD THEREOF

CROSS REFERENCE TO RELATED APPLICATIONS

This application is based on and claims priority under 35 U.S.C. § 119 to Japanese Patent Application 2015-205635 filed on Oct. 19, 2015, the entire contents of which are incorporated herein by reference.

TECHNICAL FIELD

This disclosure relates to a hydraulic torque converter which transmits power via a fluid, particularly to a torque converter which has an impeller blade, and a manufacturing method thereof.

BACKGROUND DISCUSSION

A torque converter which is mounted on a vehicle transmits the power of an engine to a transmission via a fluid. The torque converter is provided with a turbine blade, a stator blade, and an impeller blade. The stator blade controls the fluid so that a desirable flow of fluid flows into an inlet of the impeller blade.

Figure 11A:
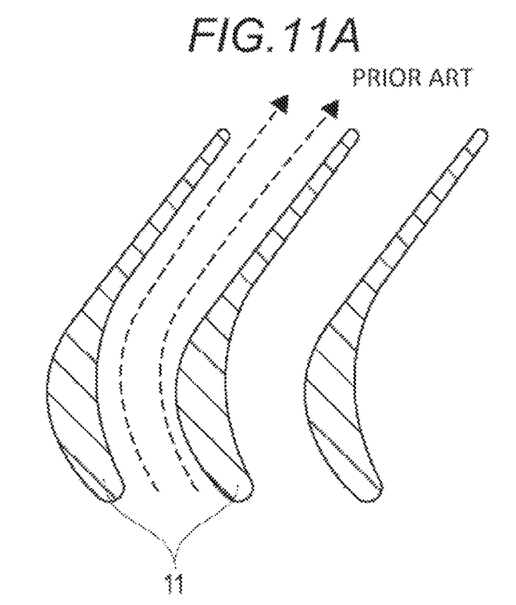
FIGS. 11A and 11B are views schematically illustrating a stator blade in a torque converter of the related art.
Figure 11B:
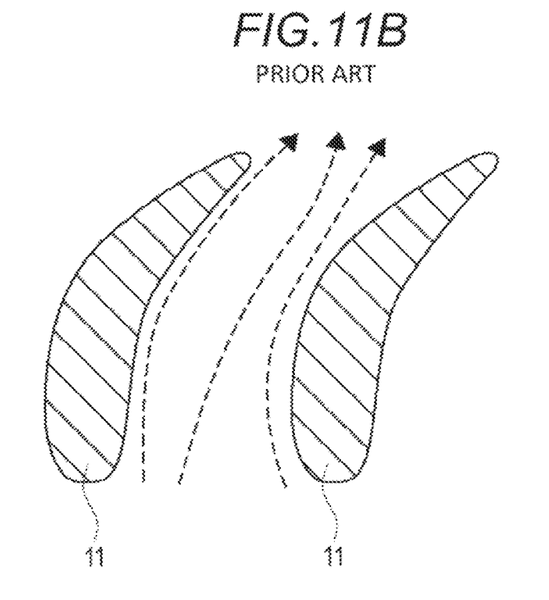
Figure 12:
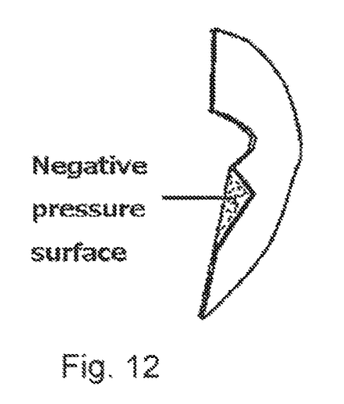
FIG. 12 is a perspective view of the blade with the negative pressure surface labeled.

As illustrated in FIG. 11A, since a torque converter of the related art has a narrow interval between stator blades 11, fluid is likely to run along a shape of the stator blade 11, and the fluid is likely to be controlled. However, as illustrated in FIG. 11B, a torque converter in recent years has had a wide interval between the stator blades 11 in order to make a manufacturing process easy. Therefore, in the vicinity of an intermediate part between one stator blade 11 and an adjacent stator blade 11, a flow of fluid which does not run along the shape of the stator blade 11 is also generated.

Therefore, an impeller blade receives the fluid which flows in the direction which is not preferable, and as a result, a high strength is required for the impeller blade. In realizing an impeller blade having a high strength, a plate thickness or a material of the impeller blade is restricted, and manufacturing costs increase.

Regarding a strength of the torque converter, JP 1-307565A (Reference 1), JP 11-2304A (Reference 2), and JP 2013-155857A (Reference 3) are known.

Reference 1 discloses a technology, in which a cutout portion is provided at a part of a press-fitting portion with respect to an impeller shell on an inner circumferential side of an impeller blade, and after the impeller blade is press-fitted to the impeller shell, by performing caulking so that a part of the impeller shell is put on the cutout portion of the impeller blade, a bonding force between the impeller blade and the impeller shell becomes strong.

Reference 2 discloses a technology, in which a projection is provided in a tab of an impeller blade, and as the projection abuts against a recess of an impeller shell, positioning and fixing of the impeller blade with respect to the impeller shell are reliably performed.

Reference 3 discloses a technology, in which a slit-like insertion hole is formed in an impeller shell, an insertion piece is formed in an impeller blade, and as the insertion piece is inserted into the insertion hole, generation of unevenness in a fixed state of the impeller blade and the impeller shell is minimized.

However, there is a problem that manufacturing costs are high in all of References 1 to 3. Specifically, in Reference 1, after press-fitting the impeller blade to the impeller shell, it is necessary to add a process of performing caulking so that a part of the impeller shell is put on the cutout portion of the impeller blade. In Reference 2, it is necessary to add a process of forming the projection in the tab. In Reference 3, it is necessary to add a process of forming the insertion piece in the impeller blade.

SUMMARY

Thus, a need exists for a torque converter which is not suspectable to the drawback mentioned above.

An aspect of this disclosure provides a torque converter which is a hydraulic torque converter that transmits power via a fluid, including: a shell which is connected to a power transmission source, and is rotated by the power of the power transmission source; an impeller blade which is fixed to an inner surface of the shell, and generates a flow in the fluid by rotating together with the shell; and a turbine runner which is connected to a power transmission destination, and is rotated by the flow of the fluid, in which the impeller blade has an inlet angle which is equal to or less than 0 degrees, and in which at least a part of an inlet portion to which the fluid enters is bent toward a rotational direction side of the impeller blade.

Another aspect of this disclosure provides a manufacturing method of an impeller blade which is a manufacturing method of an impeller blade in a hydraulic torque converter that transmits power via a fluid, including: determining an inlet angle in an inlet portion to which the fluid enters, and an outlet angle in an outlet portion from which the fluid goes out, in the impeller blade; determining a form of connecting the inlet portion and the outlet portion to each other in accordance with the inlet angle and the outlet angle; and bending at least a part of the inlet portion to a rotational direction side of the impeller blade, in a case where the inlet angle is equal to or less than 0 degrees.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments according to the disclosure will be specifically illustrated with reference to the drawings.

First Embodiment

Figure 1:
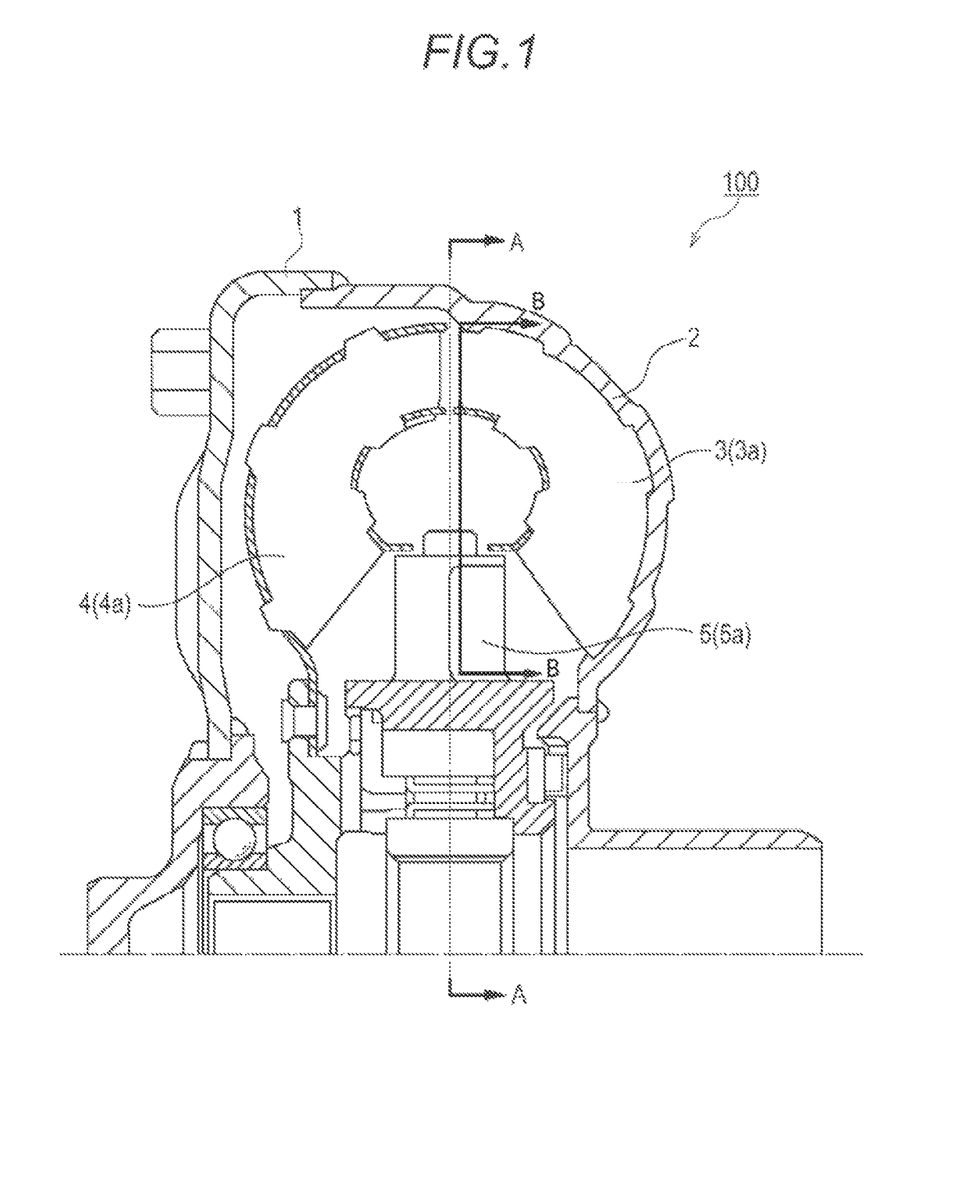
FIG. 1 is a meridian sectional view of a torque converter.

FIG. 1 is a meridian sectional view of a torque converter 100. In FIG. 1, only an upper half of the torque converter 100 is illustrated. The torque converter 100 is a hydraulic torque converter which transmits power via a fluid, such as oil, between an engine (not illustrated) provided on a left side thereof, and a transmission (not illustrated) provided on a right side thereof.

The torque converter 100 is provided with a front cover 1, a shell 2, a pump impeller 3, a turbine runner 4, and a stator wheel 5.

The front cover 1 is connected to an output shaft (not illustrated) of the engine which is a power transmission source. The shell 2 is fixed to the front cover 1 by welding or the like. The inside of the front cover 1 and the shell 2 is filled with the fluid, such as oil.

The pump impeller 3 includes a plurality of blades (hereinafter, referred to as an impeller blade 3a) fixed to an inner surface of the shell 2. The turbine runner 4 is provided to oppose the pump impeller 3, and also includes a plurality of blades (hereinafter, referred to as a turbine blade 4a). The turbine runner 4 is connected to an input shaft (not illustrated) of the transmission which is a power transmission destination. The stator wheel 5 is provided between the pump impeller 3 and the turbine runner 4, and also includes a plurality of blades (hereinafter, referred to as a stator blade 5a).

A schematic operation of the torque converter 100 is as follows. As the output shaft of the engine rotates, the front cover 1, the shell 2, and the impeller blade 3a rotate considering one-dot chain line of FIG. 1 as a rotating shaft line. Due to a centrifugal force caused by the rotation of the impeller blade 3a, a flow from the impeller blade 3a toward the turbine blade 4a is generated in the fluid on the inside. In addition, the turbine blade 4a rotates due to the flow of the fluid, and the input shaft of the transmission connected to the turbine runner 4 rotates. The stator wheel 5 amplifies power of the engine by converting the flow of the fluid from the turbine runner 4 to run along the rotational direction of the pump impeller 3.

In this manner, the power of the engine is transmitted to the transmission via the front cover 1, the shell 2, the pump impeller 3, the fluid, and the turbine runner 4 in the torque converter 100.

A characteristic of the embodiment is a shape of the impeller blade 3a, and the shape of the impeller blade 3a will be described comparing this with the general impeller blade.

Figure 2:
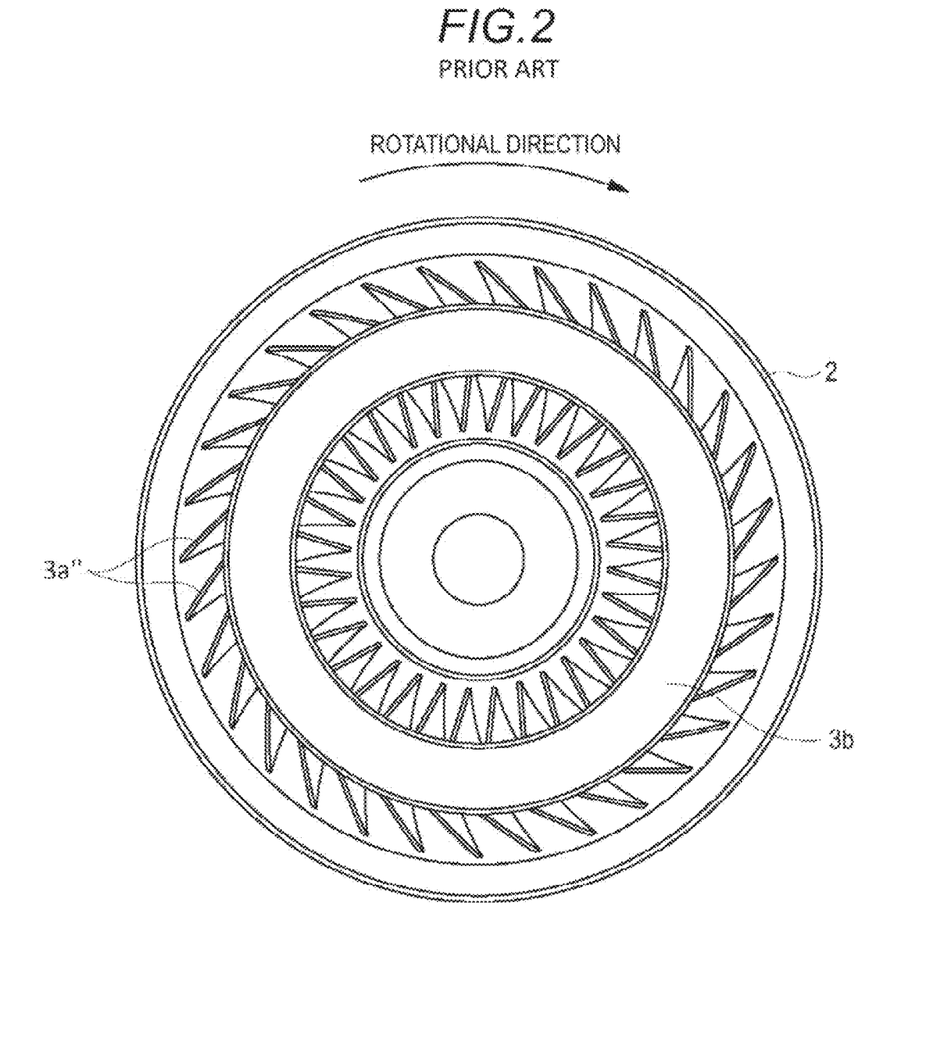
FIG. 2 is a view in the direction of a pump impeller from a section taken along line A-A in FIG. 1 which illustrates the general placement of the blades in schematic form.

FIG. 2 is a view in the direction of the pump impeller 3 from a section taken II-II line in FIG. 1. The pump impeller 3 includes a circular core 3b, and the plurality of impeller blades 3a which are aligned at a substantially equal interval along the circumferential direction of the core 3b, and the core 3b and the impeller blades 3a are provided on the inner side of the shell 2. In each of the impeller blades 3a, an outer edge is fixed to the inner surface of the shell 2, and a part of an inner edge is a curved recess, and comes into contact with the outer side of the core 3b. The impeller blade 3a is only generally illustrated in schematic form in FIG. 2. Hereinafter, the impeller blade 3a will be specifically described by using FIGS. 3A and 3B.

Figure 3A:
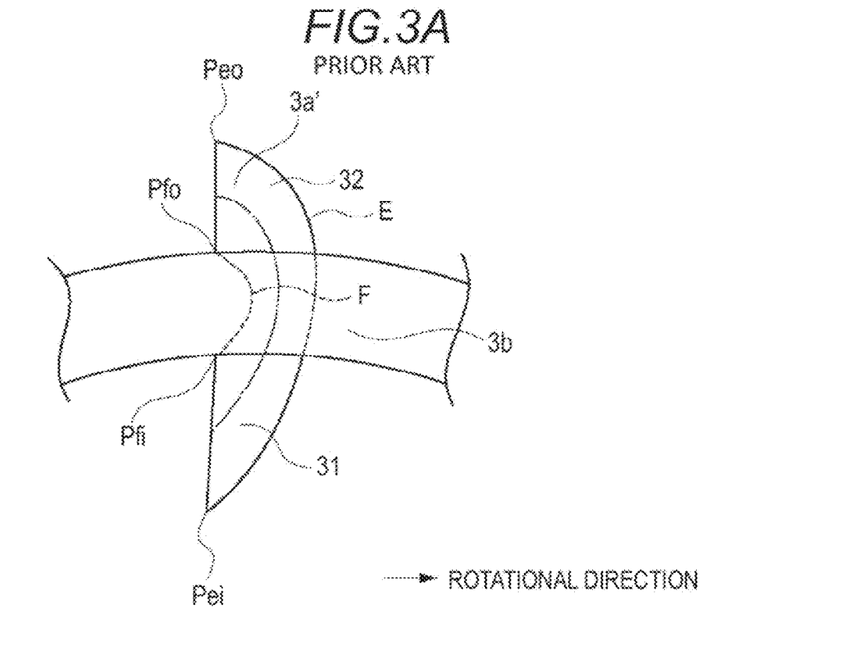
FIGS. 3A and 3B are views schematically illustrating a relationship between a core and an impeller blade in a section taken along line B-B in FIG. 1.
Figure 3B:
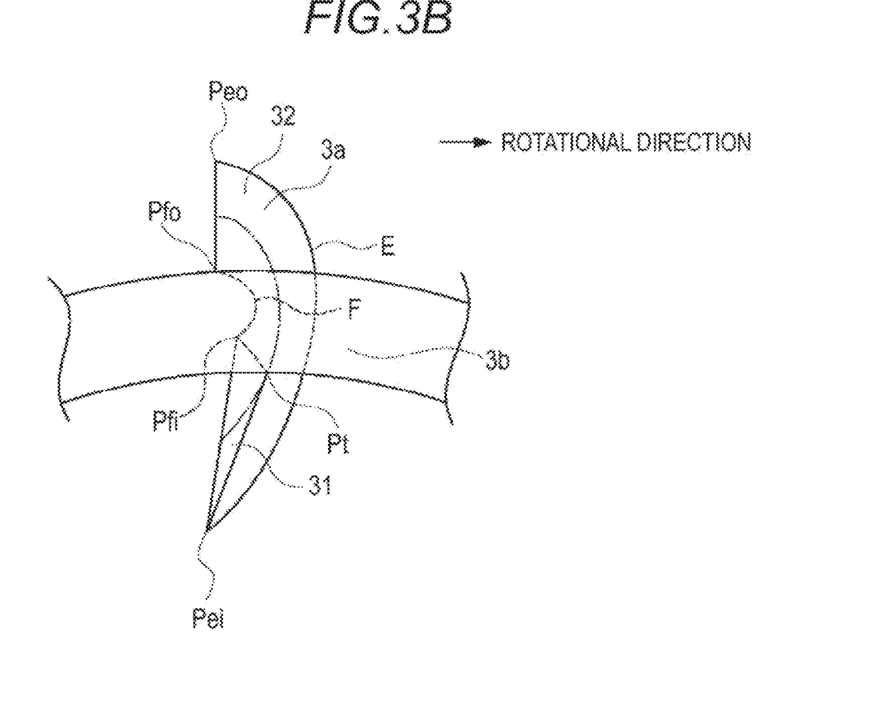

FIGS. 3A and 3B are views schematically illustrating a relationship between the core 3b and the impeller blade 3a. FIG. 3A illustrates the general impeller blade 3a', and FIG. 3B illustrates the impeller blade 3a according to the embodiment. The rotational direction of the impeller blades 3a and 3a' is rightward of FIGS. 3A and 3B. In FIGS. 3A and 3B, the fluid is input from a lower side (inner circumferential side) and comes out from an upper side (outer circumferential side). In this sense, a lower portion of the impeller blade 3a is also called an inlet portion 31, and an upper portion is also called an outlet portion 32.

As described above, an outline shape of the impeller blades 3a and 3a' has an outer edge E fixed to the shell 2, and a recess F which abuts against the core 3b. An outlet side end portion Peo of the outer edge E is connected to an outlet side end portion Pfo of the recess F in a shape of a substantially straight line. The viewpoints are common in FIGS. 3A and 3B.

In the general impeller blade 3a' illustrated in FIG. 3A, an inlet side end portion Pei of the outer edge E is connected to an inlet side end portion Pfi of the recess F in a shape of a substantially straight line.

Meanwhile, in the impeller blade 3a of the embodiment illustrated in FIG. 3B, the inlet portion 31 of the impeller blade 3a is bent toward the rotational direction. More specifically, the impeller blade 3a is bent considering a straight line which links the inlet side end portion Pfi of the recess F and the inlet side end portion Pei of the outer edge E to each other as a boundary, and a tip end portion Pt from the inlet side end portion Pfi is toward the rotational direction. In other words, there is a location at which a curvature rapidly changes in the inlet portion 31 of the impeller blade 3a.

In this manner, it is described that it is possible to decrease a strength required for the impeller blade 3a.

Figure 4A:
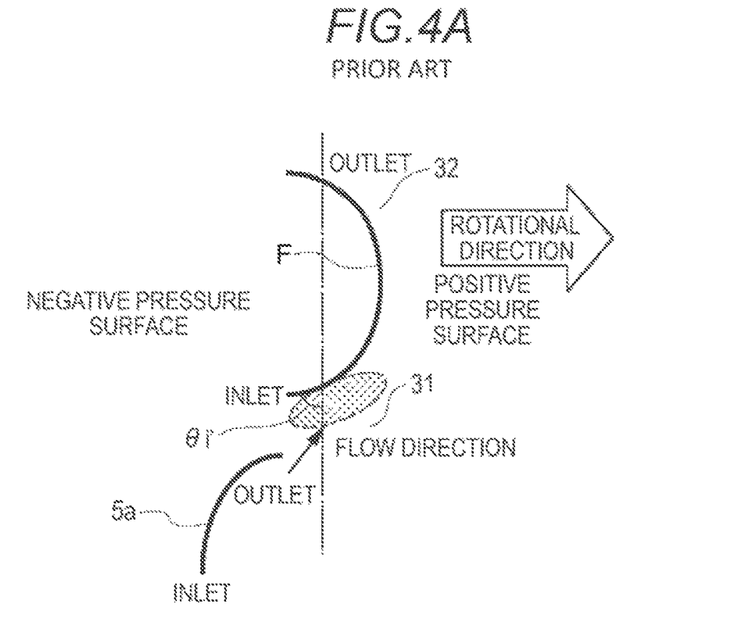
FIGS. 4A and 4B are views schematically illustrating a relationship between a stator blade and the impeller blades, and a flow of fluid in a section taken along line B-B in FIG. 1.
Figure 4B:
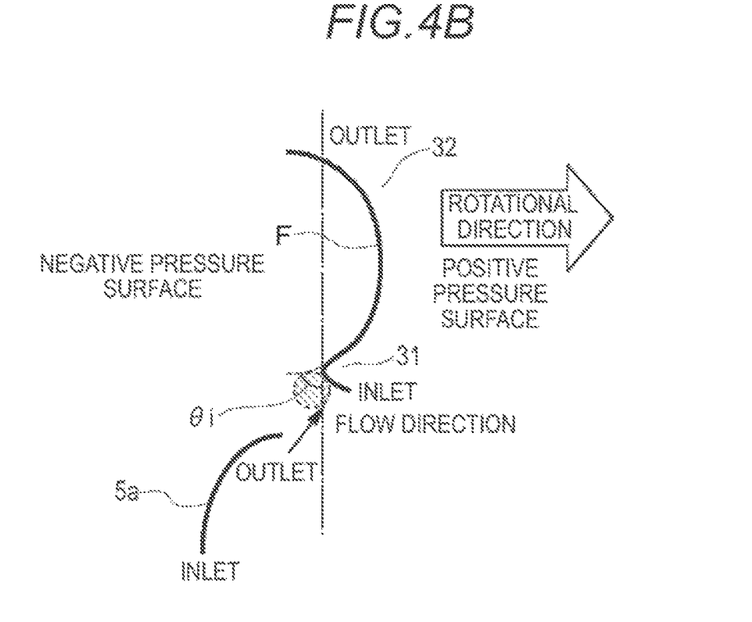

FIGS. 4A and 4B are views schematically illustrating a relationship between the stator blade 5a and the impeller blades 3a and 3a', and the flow of the fluid. FIG. 4A is a view of a case where the general impeller blade 3a' (FIG. 3A) is used, and a shape of a one-dot chain line of FIG. 3A corresponds to a shape of the impeller blade 3a' of FIG. 4A. In addition, FIG. 4B is a view of a case where the impeller blade 3a (FIG. 3B) according to the embodiment is used, and a shape of a one-dot chain line of FIG. 3B corresponds to the shape of the impeller blade 3a' of FIG. 4B. In FIGS. 4A, 4B, 6A, 6B, 6C, and 6D, the dot-dash line is a line orthogonal to the rotational direction.

The fluid circulates between an outlet from an inlet of the stator blade 5a, an outlet from an inlet of the impeller blade 3a, and an outlet from an inlet of the turbine blade 4a, but in FIGS. 4A and 4B, this is developed to make it easy to understand, and only the stator blade 5a and the impeller blades 3a and 3a' are drawn.

In FIGS. 4A and 4B, the rotational direction is rightward of FIGS. 4A and 4B, a surface (a surface on the rotational direction side) on a right side of the impeller blades 3a and 3a' is a positive pressure surface on which a pressure is applied to the fluid, and a surface (a surface opposite to the rotational direction side) on a left side is a negative pressure surface which is separated from the fluid. By the stator blade 5a, the flow of the fluid is introduced to the impeller blades 3a and 3a'.

An inlet angle θi' of the impeller blade 3a' in FIG. 4A is equal to or less than 0 degrees. In addition, the inlet angle is an angle made of a standard shaft orthogonal to the rotational direction and the inlet portion 31 of the impeller blade 3a', and is a positive angle in a case of being oriented toward the rotational direction side rather than the standard shaft. By the stator blade 5a, most of the fluid is oriented toward the positive pressure surface of the inlet portion 31 in the impeller blade 3a'. As a result, a pressure of the positive pressure surface increases, and a load (that is, a difference between a pressure of the positive pressure surface and a pressure of the negative pressure surface) applied to the inlet portion 31 of the impeller blade 3a' increases. Therefore, a high strength is required in the inlet portion 31 of the impeller blade 3a.

Meanwhile, in a case of the impeller blade 3a in FIG. 4B, the inlet angle θi is equal to less than 0 degrees, but the inlet portion 31 is bent toward the rotational direction. In addition, the impeller blade 3a is also defined based on a case where the inlet angle θi is not bent (that is, a case where the inlet angle θi does not have a part of which the curvature rapidly changes from the outlet portion 32, and is smooth).

Since the inlet portion 31 is bent to the rotational direction side, a large amount of the fluid from the stator blade 5a abuts against the negative pressure surface of the inlet portion 31 in the impeller blade 3a. In other words, the inlet portion 31 of the impeller blade 3a is bent so that the fluid from the stator blade 5a abuts against the negative pressure surface. As a result, the pressure of the negative pressure surface increases, and the load applied to the inlet portion 31 of the impeller blade 3a decreases. Therefore, the strength required in the inlet portion 31 of the impeller blade 3a can be reduced.

Figure 5:
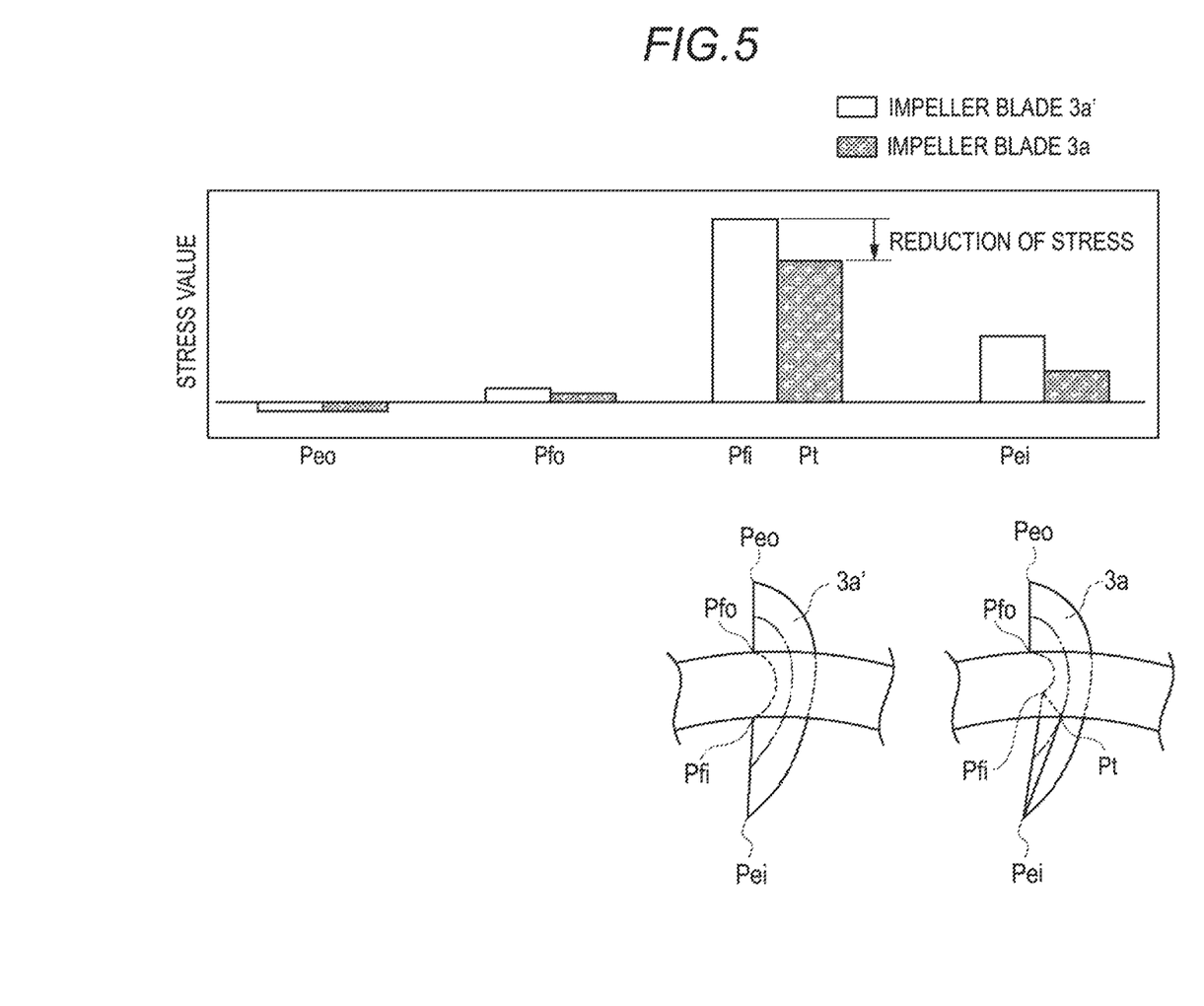
FIG. 5 is a simulation result illustrating a stress applied to the impeller blade illustrated in FIGS. 3A and 3B.

FIG. 5 is a simulation result illustrating a stress applied to the impeller blade 3a illustrated in FIGS. 3A and 3B. The stresses applied to the outlet side end portion Peo of the outer edge E in the impeller blade 3a, the outlet side end portion Pfo of the recess F, the inlet side end portion Pfi of the recess F in FIG. 3A, the tip end portion Pt in FIG. 3B, and the inlet side end portion Pei of the outer edge E, are compared with each other.

As illustrated in FIG. 5, it is ascertained that the stress applied to the tip end portion Pt in FIG. 3B is substantially reduced compared to the stress applied to the inlet side end portion Pfi of the recess F in FIG. 3A. In addition, it is ascertained that the stress applied to the inlet side end portion Pei of the outer edge E is also reduced.

Figure 6A:
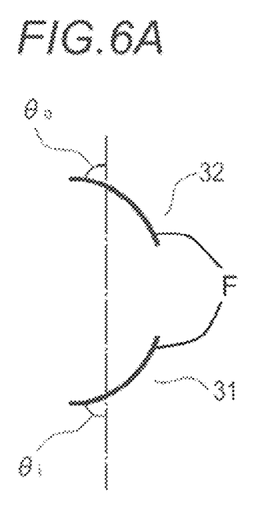
FIGS. 6A to 6D are views illustrating a design idea of the impeller blade according to an embodiment in a section taken along line B-B in FIG. 1.
Figure 6B:
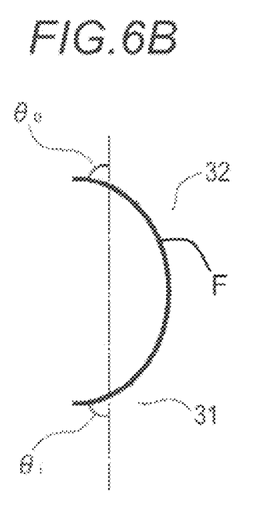

FIGS. 6A to 6D are views illustrating a design idea of the impeller blade 3a according to the embodiment. As illustrated in FIG. 6A, which illustrates the impeller blade 3a with the inlet portion 31 and outlet portion 32 but without a center portion, in accordance with the performance (for example, a capacity coefficient, efficiency, or a torque ratio) required in the torque converter 100, the inlet angle θi in the inlet portion 31 of the impeller blade 3a and an outlet angle θo in the outlet portion 32, are determined. For example, in order to improve the performance in a region in which a speed ratio (rotation speed of the turbine runner 4/rotation speed of the pump impeller 3) is low, the inlet angle θi becomes equal to or less than 0 degrees. In addition, as illustrated in FIG. 6B, a shape of a center portion is determined so that the inlet portion 31 and the outlet portion 32 are smoothly connected to each other.

Figure 6C:
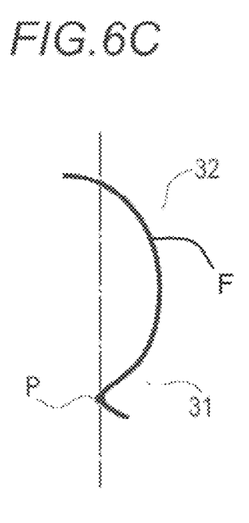

After making (a prototype) of the impeller blade illustrated in FIG. 6B in which, in the embodiment, the inlet angle θi is equal to or less than 0 degrees, the inlet portion 31 is bent toward the rotational direction, as illustrated in FIG. 6C, with the unbent part of the inlet portion 31 remaining at an inlet angle θi of equal to or less than 0 degrees. When the impeller blade 3a is provided in this manner, a curve point P is generated.

Figure 6D:
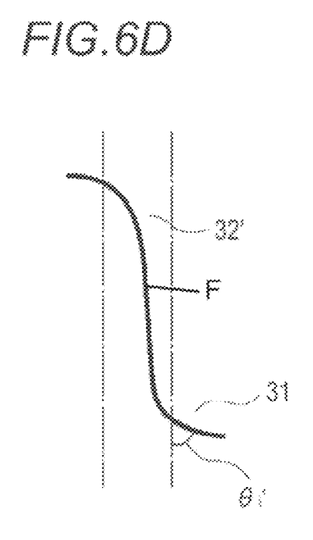

In addition, the impeller blade 3a is different from the impeller blade in which the inlet angle θi' is equal to or greater than 0 degrees. In a case where the inlet angle θi is equal to or greater than 0 degrees, as illustrated in FIG. 6D, the entire flow from an inlet portion 31' to an outlet portion 32' is smooth, and a curve portion illustrated in FIG. 6C is not present.

Meanwhile, it is also considered that the performance when designing by bending the inlet portion 31 of the impeller blade 3a cannot be obtained. However, in a desirable embodiment, as illustrated in FIG. 3B, in the inlet portion 31 of the impeller blade 3a, the impeller blade 3a is not bent in the inlet side end portion Pei of the outer edge E, and the impeller blade 3a is largely bent in the vicinity of the core 3b. In other words, a bent surface is a substantially triangle in which the points Pfi, Pt, and Pei are vertexes. In addition, in other words, the outer edge E fixed to the shell 2 does not have a curve point.

By doing so, compared to a case of not performing the bending, it is possible to suppress a change in performance. The reason thereof will be described.

Figure 7:
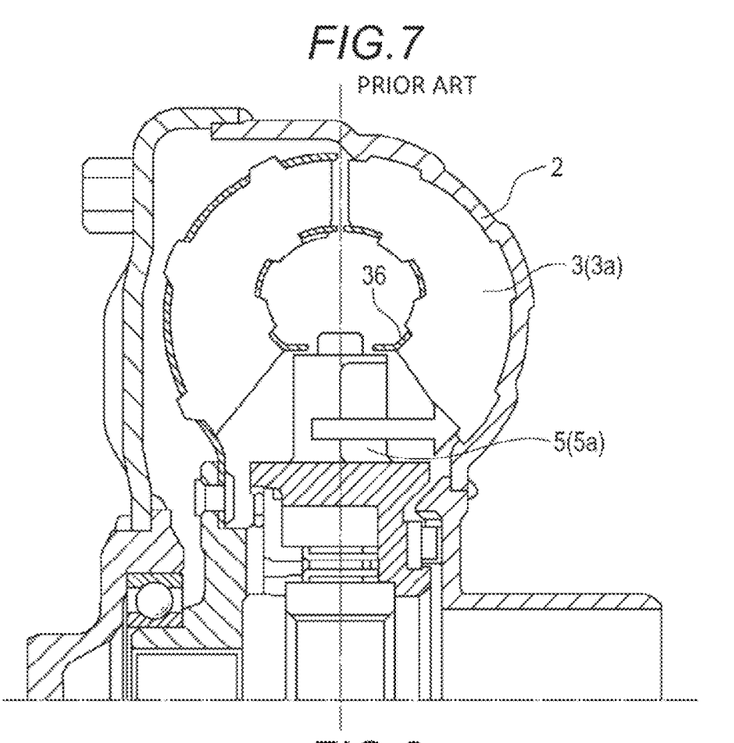
FIG. 7 is a view schematically illustrating the flow of the fluid from a stator wheel to pump impeller.

FIG. 7 is a view schematically illustrating the flow of the fluid from the stator wheel 5 to the pump impeller 3. Since the fluid from the stator wheel 5 usually goes straight, the fluid usually abuts against the shell 2 side of the impeller blade 3a, and an amount of fluid which abuts against the core 3b side is small. Therefore, in order to maintain the performance, a shape of the shell 2 side particularly in the impeller blade 3a is important. Meanwhile, a shape on the core 3b side of the impeller blade 3a is relatively not important.

Therefore, as illustrated in FIG. 3B, in the inlet side end portion Pei of the outer edge E, without bending the impeller blade 3a, it is possible to maintain the desirable performance.

Figure 8:
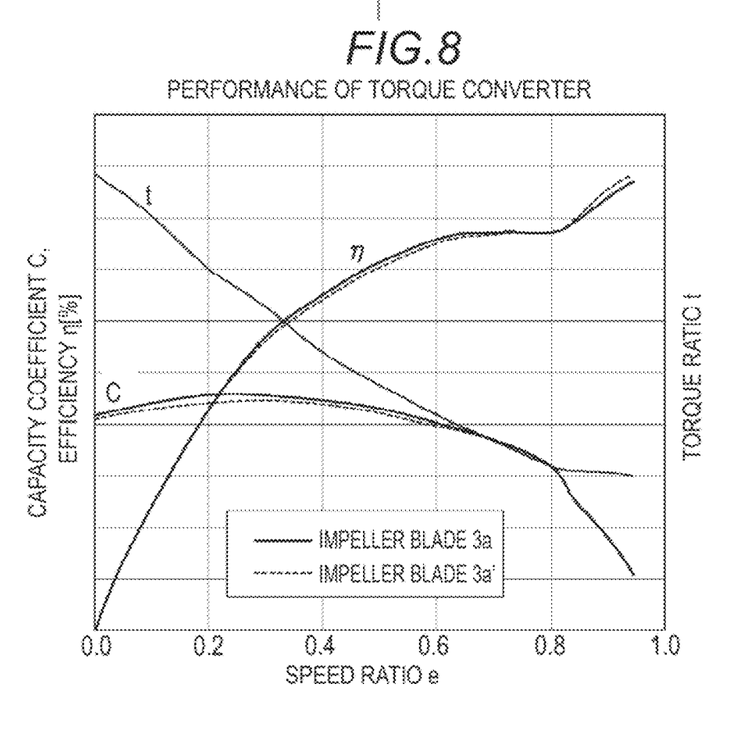
FIG. 8 is a simulation result illustrating performance of the torque converter including the general impeller blade illustrated in FIG. 3A, and performance of the torque converter including the impeller blade according to the embodiment illustrated in FIG. 3B.

FIG. 8 is a simulation result illustrating performance of the torque converter 100 including the general impeller blade 3a' illustrated in FIG. 3A, and performance of the torque converter 100 including the impeller blade 3a according to the embodiment illustrated in FIG. 3B. A capacity coefficient C, efficiency η (on a left side of a vertical axis), and a torque ratio t (on a right side of a vertical direction) with respect to a speed ratio e (horizontal axis), are illustrated as the performance of the torque converter 100. From FIG. 8, it is ascertained that there is little influence on the performance even when the inlet portion 31 of the impeller blade 3a is bent, and a performance difference can be less than a predetermined value.

Figure 9:
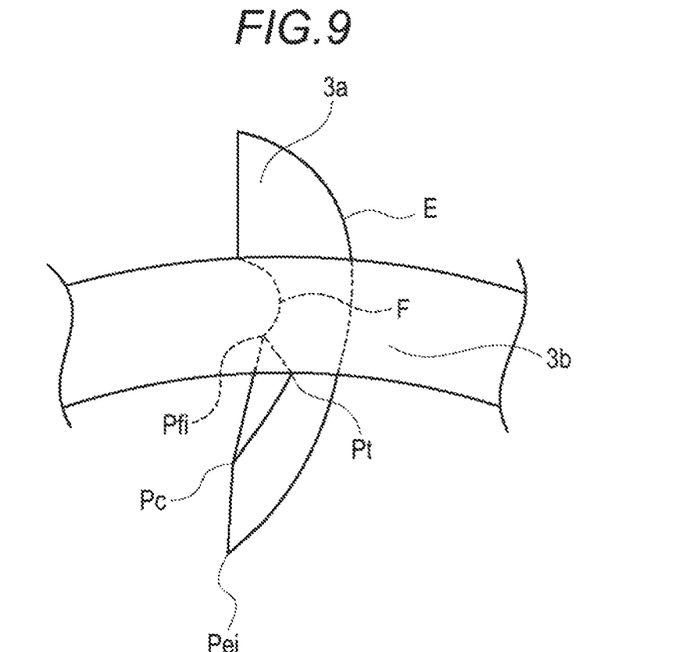
FIG. 9 is a first modification example of the impeller blade.

In addition, various variations are considered in a bending method of the impeller blade 3a. As illustrated in FIG. 9, only a part on the core 3b side may be bent in the inlet portion 31. In other words, a curve point Pc between the inlet side end portion Pfi of the recess F and the inlet side end portion Pei of the outer edge E are present, and may be bent considering the straight line which links the curve point Pc and the inlet side end portion Pfi of the recess F to each other as a boundary.

Figure 10:
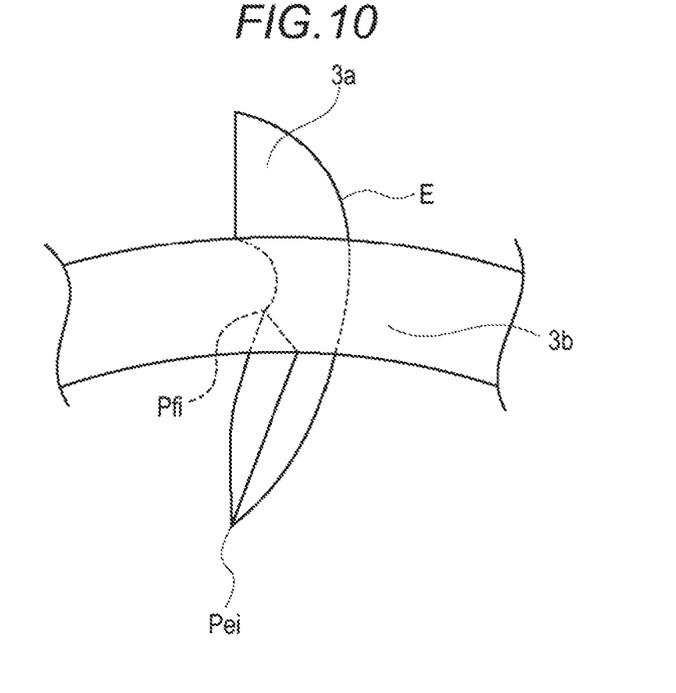
FIG. 10 is a second modification example of the impeller blade.

In addition, as illustrated in FIG. 10, a curve line which links the inlet side end portion Pfi of the recess F and the inlet side end portion Pei of the outer edge E may be bent as a boundary. In any case, at least a part of the inlet portion 31 may be bent toward the rotational direction side, and desirably, bending is not performed at the outer edge E connected to the shell 2.

In this manner, in the embodiment, in the impeller blade 3*a* in which the inlet angle θi is equal to or less than 0, the inlet portion 31 is bent toward the rotational direction. Therefore, most of the fluid abuts against the negative pressure surface of the impeller blade 3*a*, and the load applied to the inlet portion 31 decreases. As a result, the strength which is required for the impeller blade 3*a* decreases, and manufacturing costs can be minimized.

An aspect of this disclosure provides a torque converter which is a hydraulic torque converter that transmits power via a fluid, including: a shell which is connected to a power transmission source, and is rotated by the power of the power transmission source; an impeller blade which is fixed to an inner surface of the shell, and generates a flow in the fluid by rotating together with the shell; and a turbine runner which is connected to a power transmission destination, and is rotated by the flow of the fluid, in which the impeller blade has an inlet angle which is equal to or less than 0 degrees, and in which at least a part of an inlet portion to which the fluid enters is bent toward a rotational direction side of the impeller blade.

Since at least a part of the inlet portion of the impeller blade is bent toward the rotational direction side of the impeller blade, the fluid abuts against a negative pressure surface of the inlet portion, and it is possible to decrease a stress applied to the inlet portion. Accordingly, a strength required for the impeller blade decreases, and it is possible to minimize manufacturing costs.

In the torque converter according to the aspect of this disclosure, it is preferable that an outer edge which is fixed to the shell does not have a curve point, in the inlet portion for the fluid in the impeller blade.

With this configuration, compared to a case where the inlet portion is not bent, the performance hardly deteriorates.

As one embodiment, the torque converter according to the aspect of this disclosure may further include a circular core which is provided on an inner side of the shell, and the impeller blade may include an outer edge which is fixed to the shell, and a recess which comes into contact with the core, and may be bent considering a straight line which links an inlet side end portion of the recess and an inlet side end portion of the outer edge as a boundary, when viewed from the flow of the fluid.

As another embodiment, the torque converter according to the aspect of this disclosure may further include a circular core which is provided on an inner side of the shell, and the impeller blade may include an outer edge which is fixed to the shell, and a recess which comes into contact with the core, and may be bent considering a straight line which links a predetermined point between an inlet side end portion of the recess and the inlet side end portion of the outer edge, and an inlet side end portion of the recess as a boundary, when viewed from the flow of the fluid.

As another embodiment, the torque converter according to the aspect of this disclosure may further include a circular core which is provided on an inner side of the shell, and the impeller blade may include an outer edge which is fixed to the shell, and a recess which comes into contact with the core, and may be bent considering a straight line which links an inlet side end portion of the recess and an inlet side end portion of the outer edge as a boundary, when viewed from the flow of the fluid.

It is preferable that, the torque converter according to the aspect of this disclosure may further include a stator blade which guides the fluid to the impeller blade, and at least a part of the fluid from the stator blade may abut against a negative pressure surface of the impeller blade.

Another aspect of this disclosure provides a manufacturing method of an impeller blade which is a manufacturing method of an impeller blade in a hydraulic torque converter that transmits power via a fluid, including: determining an inlet angle in an inlet portion to which the fluid enters, and an outlet angle in an outlet portion from which the fluid goes out, in the impeller blade; determining a form of connecting the inlet portion and the outlet portion to each other in accordance with the inlet angle and the outlet angle; and bending at least a part of the inlet portion to a rotational direction side of the impeller blade, in a case where the inlet angle is equal to or less than 0 degrees.

Since at least a part of the inlet portion of the impeller blade is bent toward the rotational direction side of the impeller blade, the fluid abuts against a negative pressure surface of the inlet portion, and it is possible to decrease a stress applied to the inlet portion.

Since at least a part of the inlet portion of the impeller blade is bent toward the rotational direction side of the impeller blade, it is possible to minimize manufacturing costs.

The above-described embodiment is described for making it possible for those who have a general knowledge in the technical field in which the disclosure is included to realize the disclosure. It is needless to say that those skilled in the art can employ various modification examples of the above-described embodiment, and the technical idea of the disclosure is employed in other embodiments. Therefore, not being limited to the described embodiment, the disclosure should be realized in the widest range following the technical idea defined by the range of the claims.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A torque converter which is a hydraulic torque converter that transmits power via a fluid, comprising:
   a shell which is connected to a power transmission source, and is rotated by the power of the power transmission source;
   a circular core which is provided on an inner side of the shell;
   an impeller blade including an outer edge which is fixed to an inner surface of the shell and a recess which comes into contact with the circular core, and generates a flow in the fluid by rotating together with the shell;
   a stator blade which guides the fluid to the impeller blade; and
   a turbine runner which is connected to a power transmission destination, and is rotated by the flow of the fluid,
   wherein the impeller blade has an inlet portion, to which the fluid enters, a positive pressure surface which applies pressure to the fluid, and a negative pressure surface which is an opposite surface of the impeller blade to the positive pressure surface, wherein the inlet portion of the impeller blade is bent toward a rotational direction side so that at least a part of the fluid from the stator blade abuts against the negative pressure surface, and at least a part of the fluid from the stator blade abuts against the positive pressure surface.

2. The torque converter according to claim 1, wherein the impeller blade is bent over a straight line which links a point along the recess and an inlet side end point of the outer edge, when viewed from a direction of the flow of the fluid.

3. The torque converter according to claim 1, wherein the impeller blade is bent over a straight line which links a predetermined point between a point along the recess and an inlet side end point of the outer edge, and the point along the recess, when viewed from a direction of the flow of the fluid.

* * * * *